United States Patent Office 2,747,812
Patented May 29, 1956

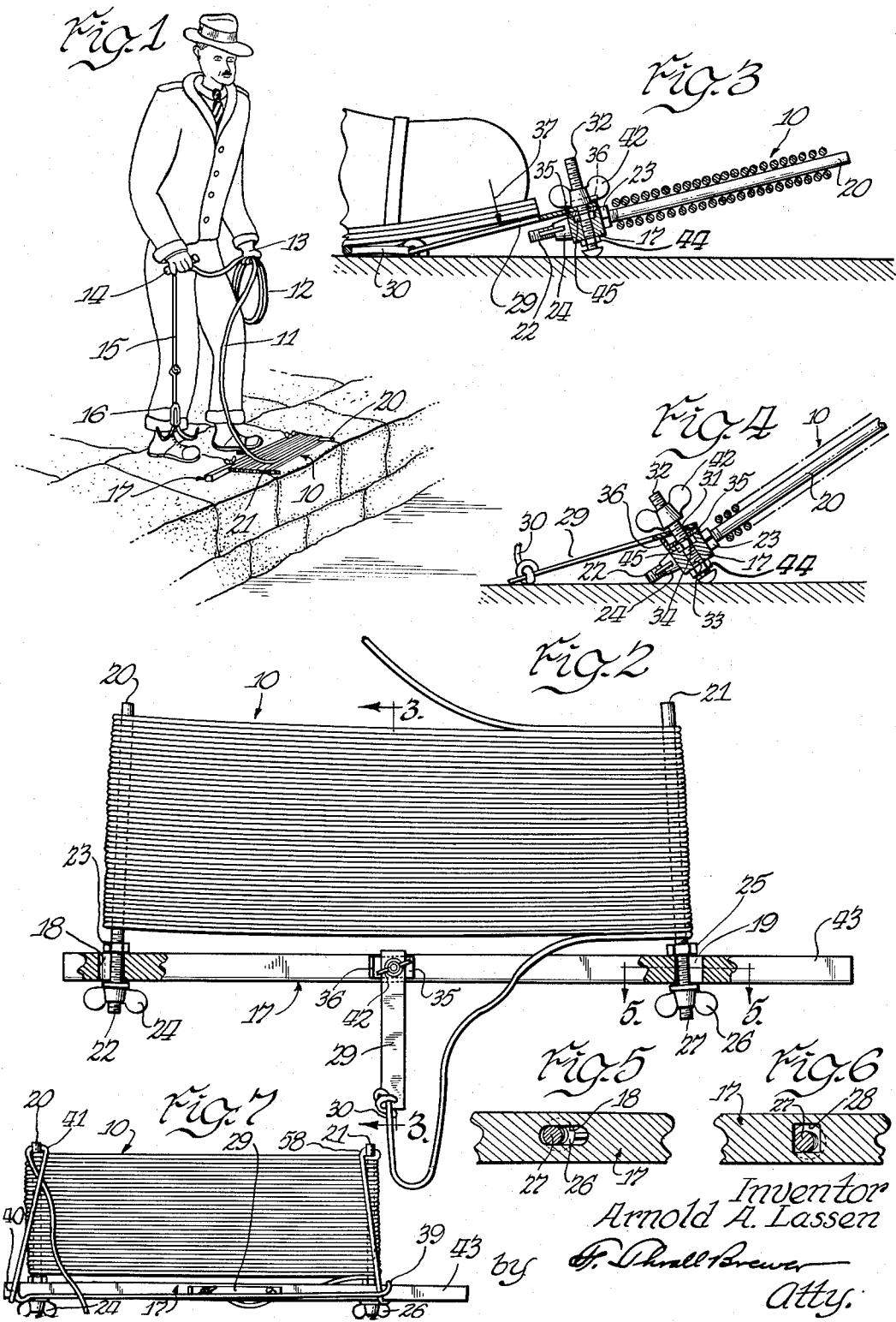

2,747,812

DEVICE FOR STORING LINES

Arnold A. Lassen, Chicago, Ill.

Application May 5, 1953, Serial No. 353,178

5 Claims. (Cl. 242—96)

This invention relates to a device for storing lines wherein one end of the line is held or fixed and the other end of the line is to be cast out.

Many situations arise where it becomes desirable or necessary to cast a line from one point to another. Where the distances are great and the line is relatively light, control of the line as it leaves the place where it is stored is essential to avoid snarling it or catching the line on some part of the storage device. One such situation arises when a fisherman wishes to establish a trot line along which to run a trolley for his fishing line. Another situation arises in rescue work where it becomes necessary to establish a line across either a body of water, an open chasm, a wrecked or burning building, etc. In all such situations it is imperative that as the line is cast out, it leaves the storage mechanism smoothly and freely.

The usual method of storing a line to be cast out consists in coiling the line either in an open space or in a drum in relatively loose fashion, the coils being carefully laid by hand before casting to insure a free movement of the line. This method of storing the line, however, calls for a certain amount of skill on the part of the one establishing the coil and also a certain amount of time which is not always available at the time the cast must be made, particularly in the case of rescue work.

The principal object of this invention is to provide a line storage device which will insure free movement of the stored line each time the free end of the line is cast out.

Another object of this invention is to provide a line storage device which is extremely flat so that it may be readily carried or put away.

A feature of this invention is a foot operated means on a line storage device which aims the storage device in the general direction in which the cast is to be made and at the same time anchors the device to the ground.

Another feature of this invention is a means on a line storage device whereby the device may be held with one hand while the weighted free end is cast out with the other hand.

A specific object of this device is to provide a line storage device comprising a bar having two rods extending upward from one surface thereof, said rods being free to incline toward one another and said line being stored on the rods by winding said line around the rods; the inclined rods providing a progressively decreasing spacing between them from the bar outward so that the line, as it leaves the rods, is pulled toward the sections of the rods which are closer together. By this construction binding of the line on the rods is prevented.

These and other objects and features of this invention will become apparent from the following detailed description of an illustrative embodiment when taken together with the accompanying drawings in which Fig. 1 shows a man about to make a cast of a line which is stored on a device made in accordance with this invention;

Fig. 2 is a side elevational view of the storage device of this invention with portions cut away to show the details of construction and certain parts of the device;

Fig. 3 is an end elevational view of the device in operative position, said device being shown in section with the section taken along line 3—3 of Fig. 2;

Fig. 4 is a view similar to Fig. 3 showing the means for changing the angle of elevation of the storage device;

Fig. 5 is an enlarged fragmentary section taken along line 5—5 of Fig. 2;

Fig. 6 is an alternative construction for the portion of the device shown in Fig. 5; and Fig. 7 shows the means for securing a line to the storage device when said device is to be carried or put away.

Referring now to the drawings for a detailed description of the form of the invention chosen for illustration and particularly to Fig. 1, there is shown a storage device 10 with a line 11 wound thereon, the free end of the line 11 being looped several times at 12 and held at the loop by the hand 13 of the person using the device. Beyond loop 12 a rod or handle 14 is tied to line 11 so as to be fixed thereto, and beyond handle 14 is a free length of line 15, to the end of which is secured an anchor 16. As shown in Fig. 1, the line storage device 10 is adapted to hold the shore end of the line, the anchor being desirably cast as far away from the shore as the length of the line will permit. Anchor 16 is cast out by swinging it in a circular path until it has attained sufficient momentum to travel the desired distance when released at an instant of travel in the proper direction.

The storage device 10 is shown more clearly in Fig. 2 and includes a base 17 in the form of a bar which may be made of wood or a light metal, such as aluminum or a magnesium alloy. The base 17 may also be made from a reinforced plastic which is preferably molded to the desired shape. Two openings 18 and 19 are formed in base 17, said openings being adapted to receive rods 20 and 21, respectively. Each of said rods 20 and 21 is comprised of a smooth, preferably cylindrical, section of metal which is threaded at one end 22 to receive a nut 23 and a wing nut 24, nut 23 being mounted above and wing nut 24 being mounted below the base 17 as viewed in Fig. 2. The diameter of the rod 20 in the opening 18 is less than the dimension of the opening 18 in a direction lengthwise of the base 17. This provides a certain amount of freedom for the rod 20 to tilt in the plane of the base 17. The degree of tilting may be controlled by the spacing between nut 23 and wing nut 24 and is limited by the size of opening 18 relative to the diameter of the rod 20. A similar nut 25 and wing nut 26 are threaded onto the end 27 of rod 21 which extends through opening 19 in base 17. The relative sizes of the rod 21 and opening 19 may be selected as in the case of rod 20 and opening 18 to provide a degree of freedom for rod 21 in the plane of base 17.

The transverse dimension of openings 18 and 19, as shown in Fig. 2, may be different from the lengthwise dimension of said openings. Thus, as shown in Fig. 5, opening 18 may be in the form of an elongated slot to provide relatively little degree of movement for rod 20 crosswise of base 17 but considerable freedom of movement lengthwise of said base 17. Alternatively, opening 18 may be in the form of a square, as shown at 28 in Fig. 6. Although under certain circumstances the square opening may be more easy to make than the elongated slot of Fig. 5, it does not provide quite as much longitudinal freedom of movement for rod 20 as opening 18 and in addition, it provides somewhat more transverse freedom than is desirable and hence the elongated form of Fig. 5 is preferred. The square form shown in Fig. 6, however, will operate successfully.

At a point located between rods 20 and 21 and preferably midway between openings 18 and 19, is located a rectangular plate 29 (Fig. 2) which, in the disclosed structure, is resilient and flexible, and serves both as the holder for the device and as a means for aiming the device in the direction in which the line is to be cast. It also serves as a means to which the end 30 of the line may be secured to prevent the entire line from being cast out.

Referring to Figs. 3 and 4, plate 29 has an opening 31 in the end adjacent base 17 through which a bolt 32 passes. Said bolt also extends through an opening 33 in base 17 and through an opening 34 in a metal member 35 which is free to rotate about bolt 32. As shown in Figs. 2 and 4, the metal member 35 has an upstanding flange 36 at one end thereof which, when the member 35 is turned to the position shown in Fig. 2, is free of rectangular plate 29, but when it is turned 90 degrees from the position shown in Fig. 2 to the one shown in Fig. 4, the flange is located beneath rectangular plate 29 to tilt said plate relative to the general plane of the device, that is, with respect to the plane determined by the rods 20 and 21. A wing nut 42 is threaded onto bolt 32 and serves to clamp plate 29, member 35 and base 17 together in any selected relation.

The head of bolt 32 may be made to extend beyond base 17 by the use of two nuts 44 and 45, one on each side of said base 17. When said nuts 44 and 45 are tightened against said base 17, bolt 32 is fixed. This provides a means for adjusting the inclination of device 10 with respect to the ground or other reference plane against which it is held.

Although rectangular plate 29, when associated with the metal member 35 in the position of the latter shown in Fig. 2, is substantially in the plane, or at least in a plane parallel to the plane, established by rods 20 and 21, nevertheless by virtue of the fact that plate 29 is disposed on one side of base 17, the device will be tilted with respect to the horizontal as shown in Fig. 3 when the device is placed on the ground with the plate 29 uppermost and pressure is exerted upon said plate in the direction of the arrow 37 by the foot of the operator of the device.

By selecting the angle of member 35 with respect to the base 17 from either one of the two angles corresponding to the two positions of member 35, shown in Figs. 3 and 4, it may be noted that two different angles of inclination of the device 10 with reference to the ground will be established, the one shown in Fig. 3 being the lesser of the two. Thus if the line is cast in a high parabola, the inclination shown in Fig. 4 may be preferred, and if the cast is in a more horizontal direction, the inclination shown in Fig. 3 may be more suitable. In general, the line leaves rods 20, 21 most freely when it is pulled in the plane established by said rods 20, 21.

The line is wound around the rods 20 and 21 in the manner shown in Fig. 2. Thus, the end 30 of the line is secured to plate 29 and is then passed around the base of rod 21, then over to rod 20 and around the base of said rod 20 and back again to rod 21, etc. until all of the undesired slack in the line is completely wound around rods 20 and 21.

In addition to holding rectangular plates 29 against the ground or other support, it is desirable to have the user's foot hold the end 30 of the line upon the ground likewise, to avoid the possibility of the line jerking loose from rectangular plate 29 and leaving the device entirely.

When the device 10 is in use it is placed upon the ground as shown in Fig. 1 with at least one of the wing nuts 24 or 26 loosened to let the corresponding rod swing inwardly along the base and member 35 is adjusted either to the position illustrated in Fig. 3 or Fig. 4, whichever is most suitable for the conditions at hand. The user's foot is pressed upon plate 29 and the end 30 of line 11 to hold both firmly in place. Enough line is then withdrawn from rods 20 and 21 to enable the user to form one or more loops 12 and to provide a sufficient free length of line 15 to enable the user to swing the anchor 16 in a circle until the desired momentum is imparted to the anchor, whereupon the line is released, and while the foot of the user continues to bear down heavily upon rectangular plate 29 and the end 30 of the line, the remainder of the line follows the anchor 16 until the latter comes to rest. In leaving rods 20 and 21, it will be observed that said rods are inclined toward one another due to the tension in line wrapped about them, and the line therefore leaves the device along a taper so that it readily works loose and does not become bound either on the rods 20 and 21 or on the line itself. After the line has come to rest, the device 10 may then be permanently anchored in any suitable fashion, or it may be held by the user, depending upon the general object to be achieved by casting out the line. A handle 43, formed by an extension of base 17, is provided by which the device 10 may be conveniently held by the user.

When it is desired to retrieve the line, the device 10 is held in one hand and the line is then wound around rods 20 and 21 when the wing nuts 24 and 26 are tight, and in the manner shown in Fig. 3, until it is substantially completely wound. For ease of carrying, however, it is desirable to secure the free end of the line in the manner shown in Fig. 7. Under these conditions the end of the line is first looped around rod 21, as shown at 38, thence downward across the wound line and around the base 17 as at 39, thence along the base 17 to the opposite end of said base and around said base as at 40, thence upward and around the top of rod 20 as at 41, and then under the line to form a bight. Rectangular plate 29 is swung around bolt 32 by loosening wing nut 42, the plate 29 assuming a position parallel to the side of base 17 so that it does not protrude beyond said base 17. Wing nut 42 is then tightened to clamp plate 29 in its said swung position.

Although the device has been described with reference to its use as a storage means for a trot line, its use is not limited to this field. It can be used generally wherever a line must be cast from one point to another, and this includes situations in which a line must be cast from a boat to a pier, or from a fire engine ladder to a point on a burning structure, or from a shore to a person or object floating in water, for harpooning large fish or whale, etc. The device also has other uses such as measuring distances. Since the distance between rods 20 and 21 can readily be measured, and the number of turns can be counted before a cast is made, the distance from the user to the point at which the weighted end of the line comes to rest can be calculated by counting the number of turns which have left the device and multiplying this number of turns by twice the spacing between rods 20 and 21.

It is also possible to remove the wound line from the rods 20 and 21 in coiled position and then by clipping the coils together, storing the coiled line externally of device 10. Thus said device 10 may be used merely to coil a line, after which the line may be removed and stored elsewhere.

It is understood that the foregoing description is merely illustrative of a preferred embodiment of the invention and that the scope of the invention therefore is not to be limited thereto but is to be determined by the appended claims.

Having thus described my invention, what I claim as new and desire to secure by Letters Patent of the United States, is:

1. A storage device for a line, one end of which is to be cast in a predetermined direction, said device comprising a pair of spaced rods around which a line is adapted to be wound, one end of each rod being free and the rods being disposed in spaced relation to one another and in substantially the same plane with the free ends pointing in substantially the same direction, said line when wound around the rods being free to leave the rods by sliding off the free ends thereof, means for holding the rods in said spaced relation, said holding means comprising a base member having an opening for each rod, each opening being elongated longitudinally of the base member and in the plane of the pair of rods, each said rod extending through its respective opening, threads on the rods on either side of said openings, a pair of spaced nuts on the rods, one nut on each side of the base member and adapted to hold the rods in the openings, said base member extending laterally beyond one of said rods to form a handle by which the device may be carried, and means for supporting the device on the ground at an angle to the general plane of the ground, said means comprising an elongated pate, means for mounting one end of said plate on the base member for swinging movement with respect thereto, from a position in which the plate is aligned with the base member to a position in which the plate is at right angles thereto and extends from the base member in a direction opposite to that in which the free ends of the rods extend from said base member and means for tilting the plate relative to the base member such that when the free end of the plate and the base member contact the ground, the free ends of the rods will be tilted upwardly in the direction in which the line is to be cast.

2. The storage device as described in claim 1, said tilting means comprising a flanged member on the base member between the elongated plate and base member and mounted to swing about the same axis as the plate, said flanged member in one position interposing the flange thereof between the elongated plate and the base member at a location on the plate disposed between the axis of swinging movement and the end of the plate, and at another position disposing the flange thereof along the side, and free, of said plate.

3. The storage device as described in claim 2, and clamping means operable along the axis of swinging movement of the plate for clamping the plate, flanged member and base member together.

4. The storage device as described in claim 2, a machine screw passing through the base member and through the flanged member and elongated plate and serving as the pivot for swinging movement of the said flange member and elongated plate, and means for adjusting the degree of extension of the screw beyond the side of the base member opposite the side thereof on which the flange member and the elongated plate are disposed, whereby to provide an additional degree of tilting adjustment for the device.

5. A storage device for a line and from which one end of the line may be cast in a predetermined direction, said device comprising a base member in the form of an elongated bar of polygonal lateral section and having longitudinally extending front, rear and side surfaces, said base member having openings extending therethrough from the front to the rear surfaces and in spaced relationship to one another longitudinally of the base member, a pair of relatively straight rods of smaller sectional dimensions than the openings and extending through said openings and movable therein longitudinally of the base member, said rods having free end portions projecting from the front surface of the base member and around which a line is adapted to be wound, releasable means for holding each of the rods in substantially perpendicular relationship to the front surface of the base member for retaining the line thereon, said holding means, when released, freeing said rods to move angularly longitudinally of the base member and toward one another to enable the line to slide off of the free end portions of the rods, and support means secured to a side surface of the base member for swinging movements toward and from said bottom surface in the general plane of the base member and rods for determining the direction toward which the rods point when the line is cast therefrom, said support means comprising a lever, and said device having threaded means passing through the base member and extending beyond the side surfaces of said base member, and means for adjusting the degree of extension of said threaded means beyond the side surfaces of said base member to change the slope of the rods relative to a supporting surface when said device is supported from said supporting surface by the end of the lever, the threaded means and one end of the base member.

References Cited in the file of this patent

UNITED STATES PATENTS

| | | |
|---|---|---|
| 941,637 | Jameson | Nov. 30, 1909 |
| 1,793,980 | Weinstein | Feb. 24, 1931 |
| 2,254,977 | Prang | Sept. 2, 1941 |
| 2,397,955 | Fowler | Apr. 9, 1946 |
| 2,423,533 | Turner | July 8, 1947 |
| 2,684,550 | Reid | July 27, 1954 |

FOREIGN PATENTS

| | | |
|---|---|---|
| 247,211 | Switzerland | Feb. 28, 1947 |